United States Patent [19]
Usami

[11] Patent Number: 6,160,912
[45] Date of Patent: Dec. 12, 2000

[54] METHOD OF CORRECTING COLOR CONVERSION DATA WITH ACCURACY

[75] Inventor: Yoshinori Usami, Minamiashigara, Japan

[73] Assignee: Fuji Photo Film Co., Ltd., Kanagawa-Ken, Japan

[21] Appl. No.: 08/862,267

[22] Filed: May 23, 1997

[30] Foreign Application Priority Data

May 24, 1996 [JP] Japan .................................. 8-129995

[51] Int. Cl.$^7$ .............................. G06K 9/00; G03F 3/08
[52] U.S. Cl. ........................................... 382/167; 358/518
[58] Field of Search .................................. 358/518, 500, 358/522–524, 427, 527, 530, 531, 537, 519; 382/305, 167

[56] References Cited

U.S. PATENT DOCUMENTS

| | | | |
|---|---|---|---|
| 4,649,566 | 3/1987 | Tsunoda et al. ............................. | 382/1 |
| 4,926,254 | 5/1990 | Nakatsuka et al. ...................... | 358/527 |
| 5,107,332 | 4/1992 | Chan ......................................... | 358/80 |
| 5,282,055 | 1/1994 | Suzuki ..................................... | 358/427 |
| 5,305,119 | 4/1994 | Rolleston et al. ...................... | 358/522 |
| 5,335,097 | 8/1994 | Murakami ............................... | 358/520 |
| 5,422,738 | 6/1995 | Ishihara et al. ......................... | 358/500 |
| 5,459,678 | 10/1995 | Feasey ................................ | 364/571.07 |
| 5,461,493 | 10/1995 | Venable .................................. | 358/520 |
| 5,481,380 | 1/1996 | Bestmann ................................ | 358/504 |
| 5,760,913 | 6/1998 | Falk ........................................ | 358/298 |
| 5,761,070 | 6/1998 | Conners et al. .................... | 364/478.11 |

FOREIGN PATENT DOCUMENTS

| | | | |
|---|---|---|---|
| 60-114862 | 6/1985 | Japan ................................. | G03F 3/08 |
| 3-131920 | 6/1991 | Japan ................................. | G06F 3/12 |
| 4-196676 | 7/1992 | Japan ................................. | H04N 1/40 |
| 4-196678 | 7/1992 | Japan ................................. | H04N 1/40 |
| 4-217167 | 8/1992 | Japan ................................. | H04N 1/40 |
| 4-362869 | 12/1992 | Japan ................................. | H04N 1/40 |

*Primary Examiner*—Bhavesh Mehta
*Attorney, Agent, or Firm*—Sughrue, Mion, Zinn, Macpeak & Seas, PLLC

[57] ABSTRACT

A reference chart of a target color is generated, and device data corresponding to calorimetric data of the reference chart are determined from color conversion data. A balance chart is generated on the basis of the device data and device data in the vicinity thereof. Patches of the balance chart which are visually color-matched to the reference chart are selected under desired observational conditions, and corrective data based on a deviational quantity between the device data of the selected patches and the device data to be color-matched to the reference chart. The color conversion data are corrected with the corrective data for thereby achieving visual color matching with respect to the target color.

12 Claims, 7 Drawing Sheets

METHOD OF CORRECTING COLOR CONVERSION DATA WITH ACCURACY

BACKGROUND OF THE INVENTION

1. Field of the Invention

The present invention relates to a method of correcting color conversion data for converting color image data into device data in an image output device thereby to achieve a desired color reproduction depending on different color reproduction accuracies, color reproduction status variations, color perception differences due to different observational environments, etc.

2. Description of the Related Art

Image output devices for outputting a color image to an output medium such as a printed document, a hard copy, a CRT, etc. reproduce the color image by achieving area and density modulations of a halftone dot percentage on the output medium based on device data of colors C, M, Y, K or R, G, B. The reproduced color image has color characteristics largely depending on the properties of color materials and a support medium such as an output sheet of paper, fluorescent materials, etc.

There have been proposed a variety of processes for determining device data capable of obtaining desired color images with respect to various many image output devices and output mediums. For example, Japanese laid-open patent publication No. 3-131920 discloses a process of determining device data by a direct mapping conversion using a predetermined color conversion table produced for a certain printer or under certain printing conditions. According to another process revealed in Japanese laid-open patent publication No. 4-362869, a maximum likelihood solution of a coefficient for a masking process is determined to equalize calorimetric values of different image output devices, and device data are obtained using the coefficient.

However, even when a color image is reproduced with color conversion data processed for highly accurate color matching, the color image may not have colors that are sufficiently satisfactory.

Specifically, color images reproduced by image output devices of the same type which operate under the same output principles and output conditions may suffer color errors even if color conversion data capable of equalizing colors metamerically with a target color are established for the image output devices because the individual image output devices are subject to characteristic differences and aging.

When a proof for a color image is produced, a target output medium such as a printed document, a hard copy, a CRT, etc. and an output medium used as the proof may not necessarily have the same spectral characteristics as each other. If an observational light source has a different spectral distribution, then colors reproduced on the proof differ from a target color.

Furthermore, since color conversion data established for image output devices are determined using color matching functions based on average human visual characteristics, reproduced colors may be perceived differently by different human observers due to their visual perception differences.

One image output device for simulating finished properties of a printed document on a CRT is disclosed in Japanese laid-open patent publication No. 60-114862, for example. For correcting color conversion data of individual image output devices to equalize reproduced colors as they are visually perceived by human observers in view of different image output device characteristics and observational conditions, outputted results on output mediums are compared with each other based on colors simulated by the disclosed image output device until the colors as visually perceived are equalized on a trial-and-error basis. However, such a process needs a considerable amount of labor and skill for adjusting output colors.

It is quite difficult to correct only a certain color in view of different image output devices and different observational conditions and human observers while saving color conversion data of other colors. For example, Japanese laid-open patent publications Nos. 4-196676, 4-196678, and 4-217167 disclose processes for correcting the saturation, lightness, or hue of each of the colors in an isochromatic difference space such as an $L^*a^*b^*$ color space, and these disclosed processes require a large amount of corrective calculations because they are carried out three-dimensionally. Such a large amount of corrective calculations tends to disrupt an overall color tone and a continuity of gradations. Specifically, inasmuch as control quantities for actual colors of C, M, Y, K or R, G, B that are to be corrected do not monotonously increase (decrease) as control quantities in the isochromatic difference space monotonously increase (decrease), when device data are determined and outputted using data corrected in the isochromatic difference space, a discontinuous mapping relationship is likely to appear.

SUMMARY OF THE INVENTION

It is a general object of the present invention to provide a method of correcting color conversion data established for a target color in an image output device, very easily and highly accurately depending on the color reproduction accuracy of the image output device, color reproduction status variations thereof, color perception differences due to different observational environments, etc., and reproducing colors without adversely affecting colors other than the target color.

A major object of the present invention is to provide a method of correcting color conversion data to reproduce colors highly accurately regardless of characteristic differences and aging of individual image output devices.

Another object of the present invention is to provide a method of correcting color conversion data to reproduce colors highly accurately regardless of the spectral distribution of an observational light source.

Still another object of the present invention is to provide a method of correcting color conversion data accurately to reproduce colors which will be visually perceived equally by different human observers.

A yet still another object of the present invention is to provide a method of correcting color conversion data accurately without disrupting an overall color tone and a continuity of gradations after the color conversion data are corrected.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENTS

Figure 1:
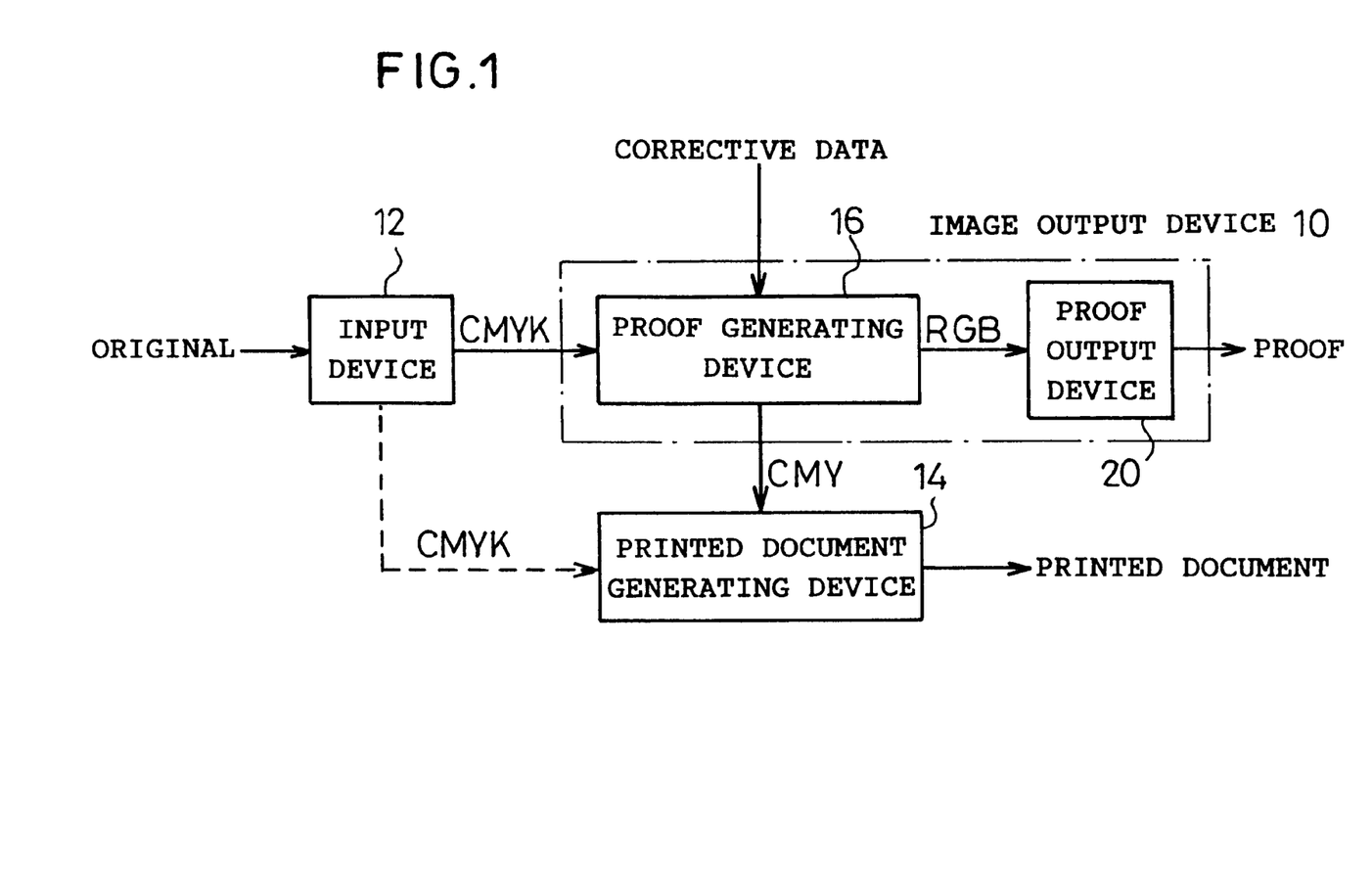
FIG. 1 is a block diagram of a system for effecting visual color matching between a proof and a printed document depending on observational conditions.

FIG. 1 is a block diagram of a system for effecting visual color matching between a proof and a printed document depending on observational conditions. The system shown in FIG. 1 carries out a method of correcting color conversion data accurately according to the present invention. The system shown in FIG. 1 serves to correct characteristics of the image output device 10 so as to be able to generate a proof which is visually color-matched to a printed document under user's observational conditions with respect to a desired target color (gray in this embodiment). Conditions which affect visual color matching include, for example, observational conditions of a light source for illuminating a printed document, color materials of a printed document, and visual characteristics of an observer of a printed material.

For generating a printed document, a color image recorded on an original is read by an input device 12 such as a scanner or the like and converted thereby into color image data C, M, Y, K (hereinafter referred to as "color image data CMYK") which comprise halftone dot percentage data of the colors C, M, Y, K. The color image data CMYK are then supplied to a printed document generating device 14. Based on the supplied color image data CMYK, the printed document generating device 14 produces four halftone dot films of C, M, Y, K, for example, produces printing plates from the halftone dot films, and generates a printed document using the printing plates.

Figure 2:
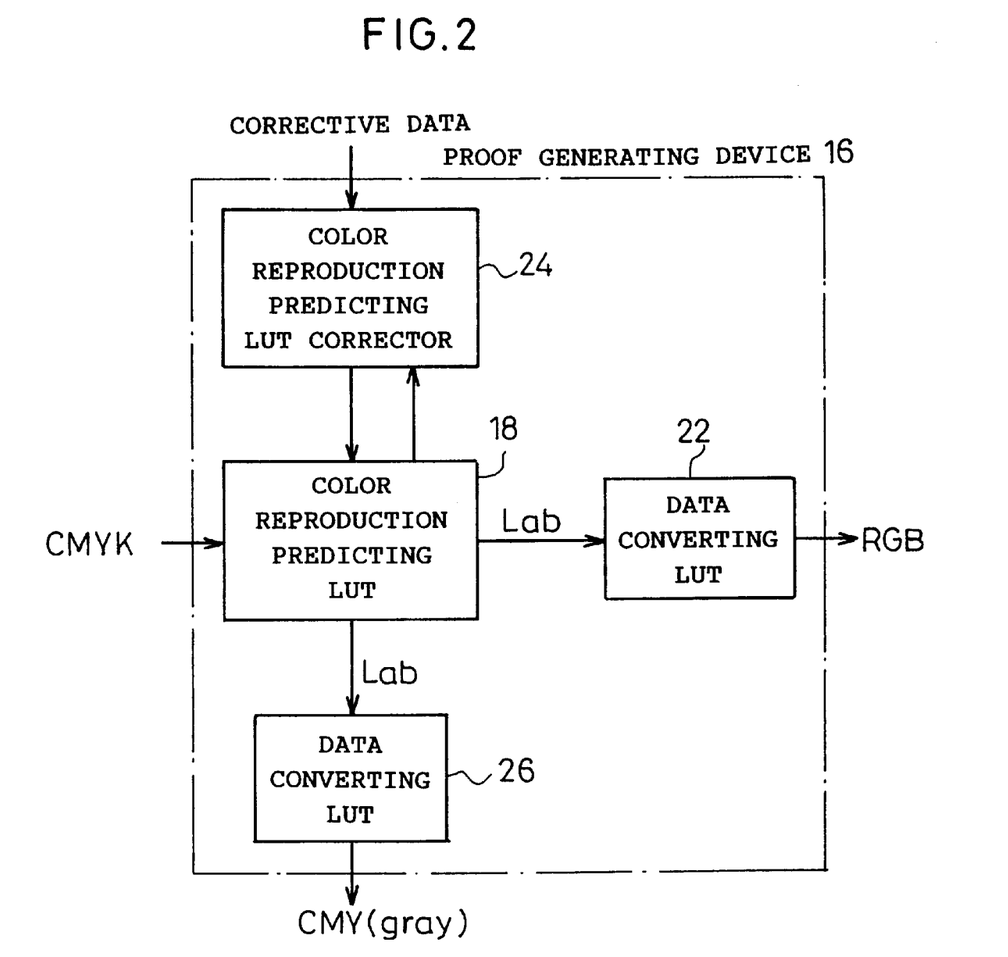
FIG. 2 is a block diagram of a proof generating device in the system shown in FIG. 1.

For generating a proof for the printed document, the color image data CMYK from the input device 12 are supplied to a proof generating device 16 of the image output device 10. In order to predict color reproduction characteristics in a calorimetric space, as shown in FIG. 2, the proof generating device 16 converts the color image data CMYK into calorimetric data L*, a*, b* (hereinafter referred to as "colorimetric data Lab") using color conversion data 18 (hereinafter referred to as a "color reproduction predicting LUT (lookup table) 18") established in view of printing condition. Then, the calorimetric data Lab are converted into device data R, G, B (hereinafter referred to as "device data RGB") established in view of characteristics of a proof output device 20. The device data RGB are supplied to the proof output device 20. The proof output device 20 energizes a laser beam source or the like based on the supplied device data RGB to output a proof for the printed document.

Figure 3:
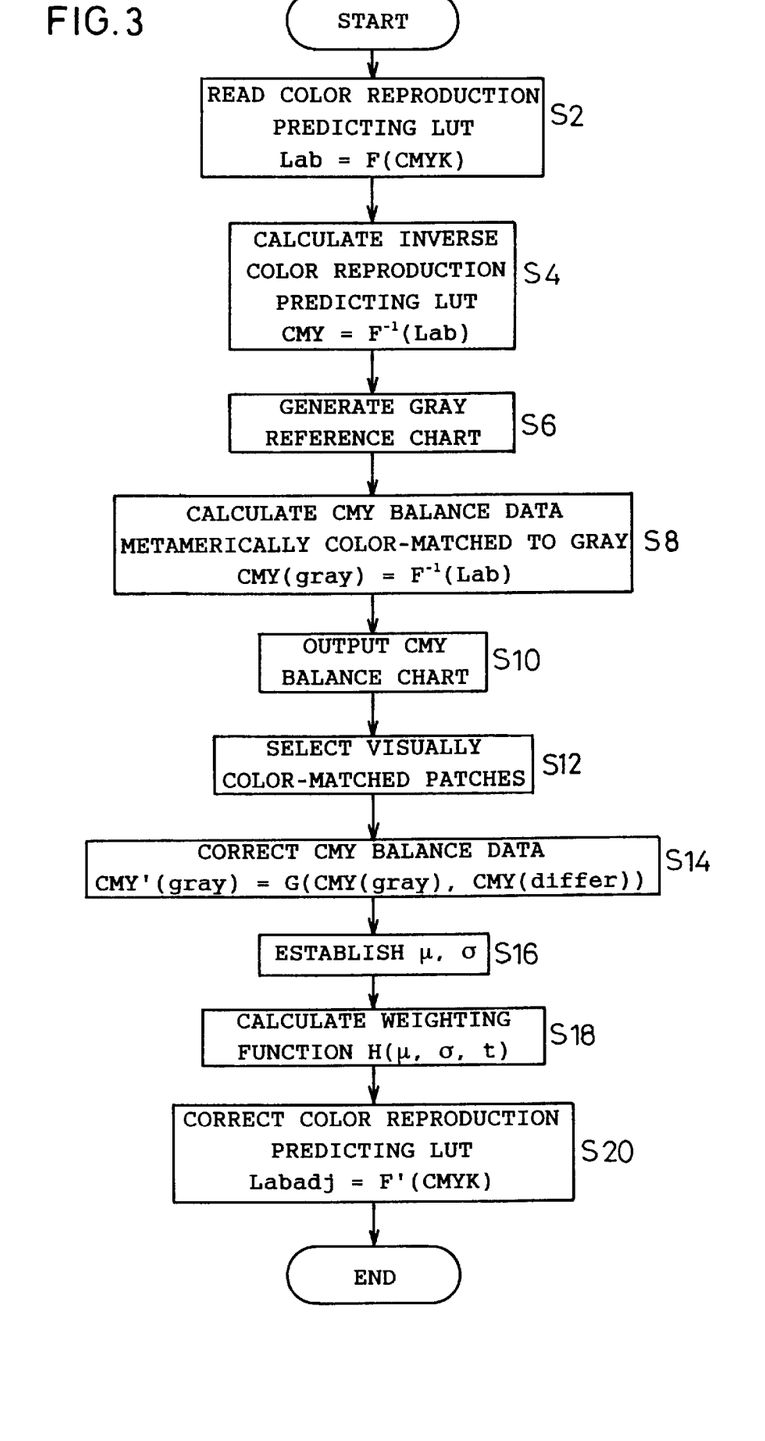
FIG. 3 is a flowchart of a process of correcting color conversion data for the color of gray in the system shown in FIG. 1.

A process of correcting color conversion data to establish color matching between the printed document and the proof with respect to the color gray under arbitrary user's observational conditions will be described below with reference to FIG. 3.

A color reproduction predicting LUT corrector 24 in the proof generating device 16 reads the color reproduction predicting LUT 18 in a step S2. The color reproduction predicting LUT 18 represents the relationship between the color image data CMYK and the calorimetric data Lab as follows:

$$Lab = F(CMYK) \tag{1}$$

where F is a function.

Then, the proof generating device 16 determines in a step S4 the relationship between the calorimetric data Lab and the color image data CMY when the color image data K is 0, using an inverse function $F^{-1}$ of the equation (1), as follows:

$$CMY = F^{-1}(Lab) \tag{2}$$

The inverse function $F^{-1}$ can be determined from the equation (2) through an inverse conversion using the Newtonian successive approximation or the like. The inverse function $F^{-1}$ is established as a data converting LUT 26 in the proof generating device 16.

Thereafter, a gray reference chart which is a target reference chart comprising predetermined gradations is produced in a step S6. Since a printed document of the color K generated on the basis of the color image data K is substantially completely achromatic and its color does not essentially vary dependent on user's observational conditions, the gray reference chart can be produced by the printed document generating device 14 using the color image data K. The gray reference chart may be generated according to any of other desired processes.

Then, the proof generating device 16 generates color image data CMY which are metamerically color-matched to the target color of gray of the gray reference chart, using the data converting LUT 26 in a step S8. The generated color image data CMY are referred to as CMY balance data CMY (gray). Specifically, if the gray reference chart is generated by the printed document generating device 14 using the color image data K, then colorimetric data Lab with respect to the color image data K are determined according to the equation (1) with C=M=Y=0, and the CMY balance data CMY (gray) are determined with respect to the calorimetric data Lab as follows:

$$CMY(\text{gray}) = F^{-1}(Lab) \tag{3}$$

If the gray reference chart is generated according to any of other desired processes in which the gray reference chart does not use the color image data K, then colorimetric data Lab are measured, and the CMY balance data CMY (gray) are determined using the equation (3). The CMY balance data CMY (gray) represent an equivalent neutral density (END) or an equivalent neutral ink value (ENIV) with respect to the color image data K.

Then, a plurality of proximity data are determined by slightly varying the color image data CMY of the CMY balance data CMY (gray), and a CMY balance chart is generated by the printed document generating device 14 from the CMY balance data CMY (gray) and the plurality of proximity data in a step S10.

Figure 4:
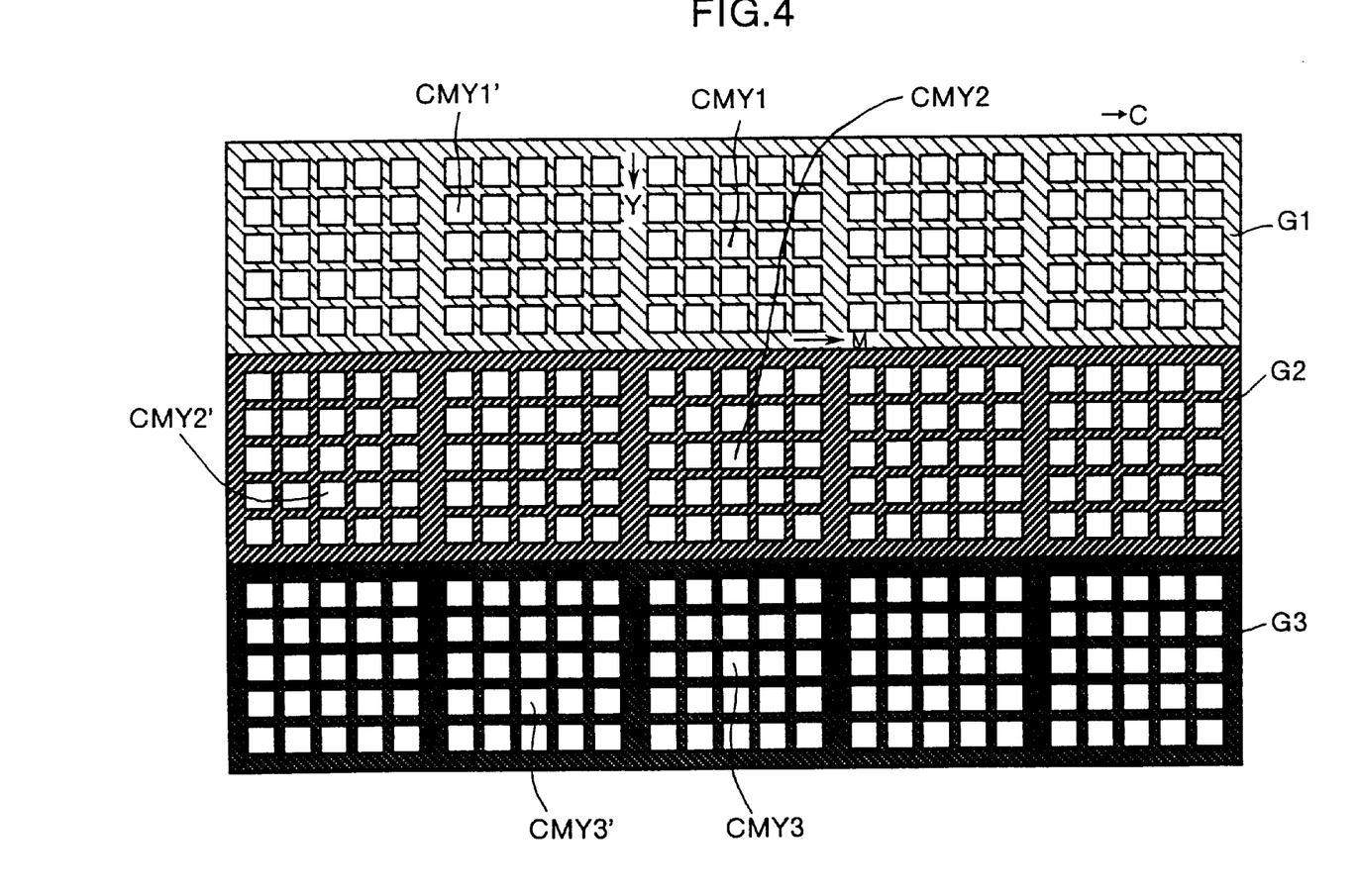
FIG. 4 is a diagram showing a reference chart and a balance chart which are used in the process of correcting color conversion data for the color of gray in the system shown in FIG. 1.
Figure 5A:
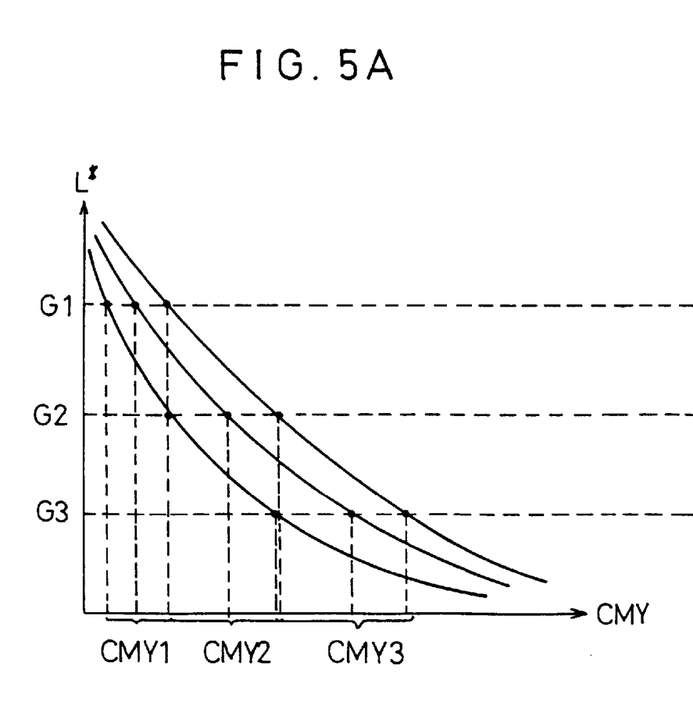
FIG. 5A is a diagram showing CMY balance data before they are corrected.

FIG. 4 shows the gray reference chart and the CMY balance chart thus generated. In FIG. 4, the reference characters G1~G3 indicate three patch arrays of the gray reference chart which comprises three gradations, and the reference characters CMY1_CMY3 at the respective centers of the patch arrays G1~G3 indicate patches of the CMY balance chart generated from the CMY balance data CMY (gray). FIG. 5A shows the relationship between calorimetric data L* of the patch arrays G1~G3 of the gray reference chart and color image data CMY of the patches CMY1~CMY3 of the CMY balance chart. The patches CMY1~CMY3 are surrounded by a plurality of patches CMY1'~CMY3' which comprise the plurality of proximity data that have been produced by slightly varying the color image data CMY. The patches CMY1~CMY3, CMY1'~CMY3' in the patch arrays G1~G3 are grouped into 15 patch groups each comprising 5×5 (=25) patches. In each of the 15 patch groups, the patches have color image data M slightly different in the horizontal direction in FIG. 4 with respect to the central patch and color image data Y slightly different in the vertical direction in FIG. 4 with respect to the central patch. The five patch groups in each of the patch arrays G1~G3 have color image data C slightly different in the horizontal direction in FIG. 4. These color image data M, Y, C are slightly different by existing equal intervals such as of 1%, 2%, or the like.

The operator of the system observes the gray reference chart and the CMY balance chart which have been generated as described above under observational conditions for observing the proof, and selects those patches which are visually color-matched to the patch arrays G1~G3 in a step S12. If the printed material and the proof are observed under the same conditions as the observational conditions under which the color reproduction predicting LUT 18 has been defined, then those patches which are visually color-matched to the patch arrays G1~G3 are the central patches CMY1~CMY3. However, if under different observational conditions because of a different spectral distribution of an observational light source or different visual characteristics of an observer, then those patches which are visually color-matched in the patch arrays G1~G3 are patches CMY1'~CMY3' which are positionally displaced from the central patches CMY1~CMY3. Therefore, a deviational quantity CMY (differ) between the patches CMY1~CMY3 and the patches CMY1'~CMY3' is determined, and the CMY balance data CMY (gray) are corrected on the basis of the determined deviational quantity. As a result, CMY balance data CMY' (gray) which serve as corrective data for color-matching the printed material and the proof under different observational conditions with respect to the target color of gray can be determined using a function G in a step S14 according to the following equation (4):

$$CMY'(\text{gray})=G(CMY(\text{gray}), CMY(\text{differ})). \quad (4)$$

A process of determining the CMY balance data CMY' (gray) will be described below. Color image data Cadj, Madj, Yadj which make up the corrected CMY balance data CMY' (gray) are represented by linear combination polynomials of the color image data C, M, Y which make up the CMY balance data CMY (gray) before they are corrected, as follows:

$$Cadj=a0+a1 \cdot C+a2 \cdot C^2+ \ldots +an \cdot C^n$$

$$Madj=a0+a1 \cdot M+a2 \cdot M^2+ \ldots +an \cdot M^n$$

$$Yadj=a0+a1 \cdot Y+a2 \cdot Y^2+ \ldots +an \cdot Y^n \quad (5)$$

where a0~an are coefficients and n is a natural number.

If it is assumed that color image data at k points ($k \geq n+1$) of the CMY balance data CMY (gray) with respect to the color image data C are represented by C1~Ck, then the corrected color image data Cadj1~Cadjk newly determined from the deviational quantity CMY (differ) are expressed from the equations (5) as follows:

$$Cadj1=a0+a1 \cdot C1+a2 \cdot C1^2+ \ldots +an \cdot C1^n$$

$$\ldots$$

$$Cadjk=a0+a1 \cdot Ck+a2 \cdot Ck^2+ \ldots +an \cdot Ck^n. \quad (6)$$

The equations (6) can be expressed by a matrix as follows:

$$Y=X \cdot A \quad (7)$$

where $$\begin{pmatrix} Cadj1 \\ \vdots \\ Cadjk \end{pmatrix} = Y, \begin{pmatrix} 1 & C1 & \cdots & C1^n \\ & & \ddots & \\ 1 & Ck & \cdots & Ck^n \end{pmatrix} = X, \begin{pmatrix} a0 \\ \vdots \\ an \end{pmatrix} = A. \quad (8)$$

Rather than establishing the equations (6), the matrix according to the equations (8) may be directly established, or a lookup table may be established to determine a coefficient A.

The coefficient A which satisfies the relationship according to the equation (7) is determined according to the least square method to minimize an error e expressed by the following equation (9):

$$e=(Y-X \cdot A)^T \cdot (Y-X \cdot A) \quad (9)$$

where T represents the transpose of a matrix where the rows and columns are interchanged.

A condition for minimizing the error e is given by:

$$\partial e/\partial A=-2X^T(Y-X \cdot A)=0. \quad (10)$$

Therefore, the coefficient A can be determined from the equation (10). By placing the coefficient A in the equations (5), the corrected color image data Cadj can be determined.

Figure 5B:
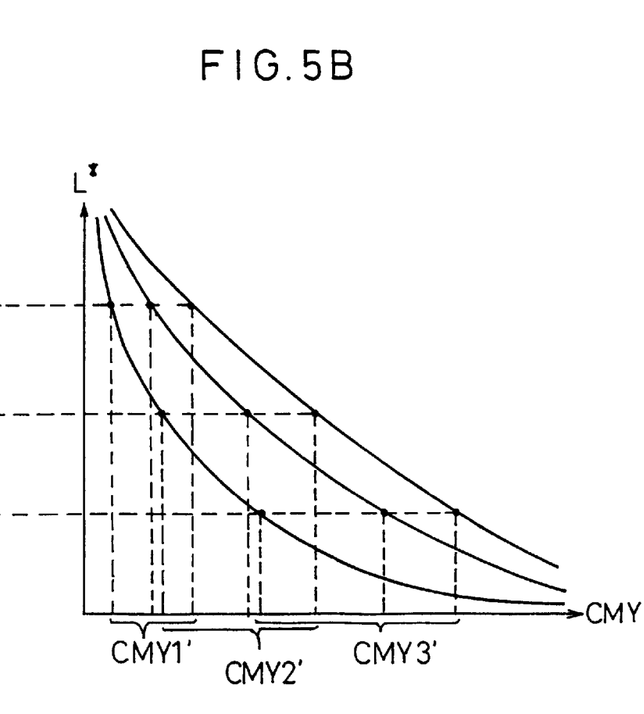
FIG. 5B is a diagram showing CMY balance data after they are corrected.

Similarly, the corrected color image data Madj, Yadj can be determined. The corrected CMY balance CMY' (gray) shown in FIG. 5B can now be determined from these corrected color image data.

The CMY balance CMY' (gray) can also be determined using three data including one deviational quantity CMY (differ) at a one point between 1% and 100% and fixed CMY balance data CMY (gray) at 1% and 100%.

Figure 6:
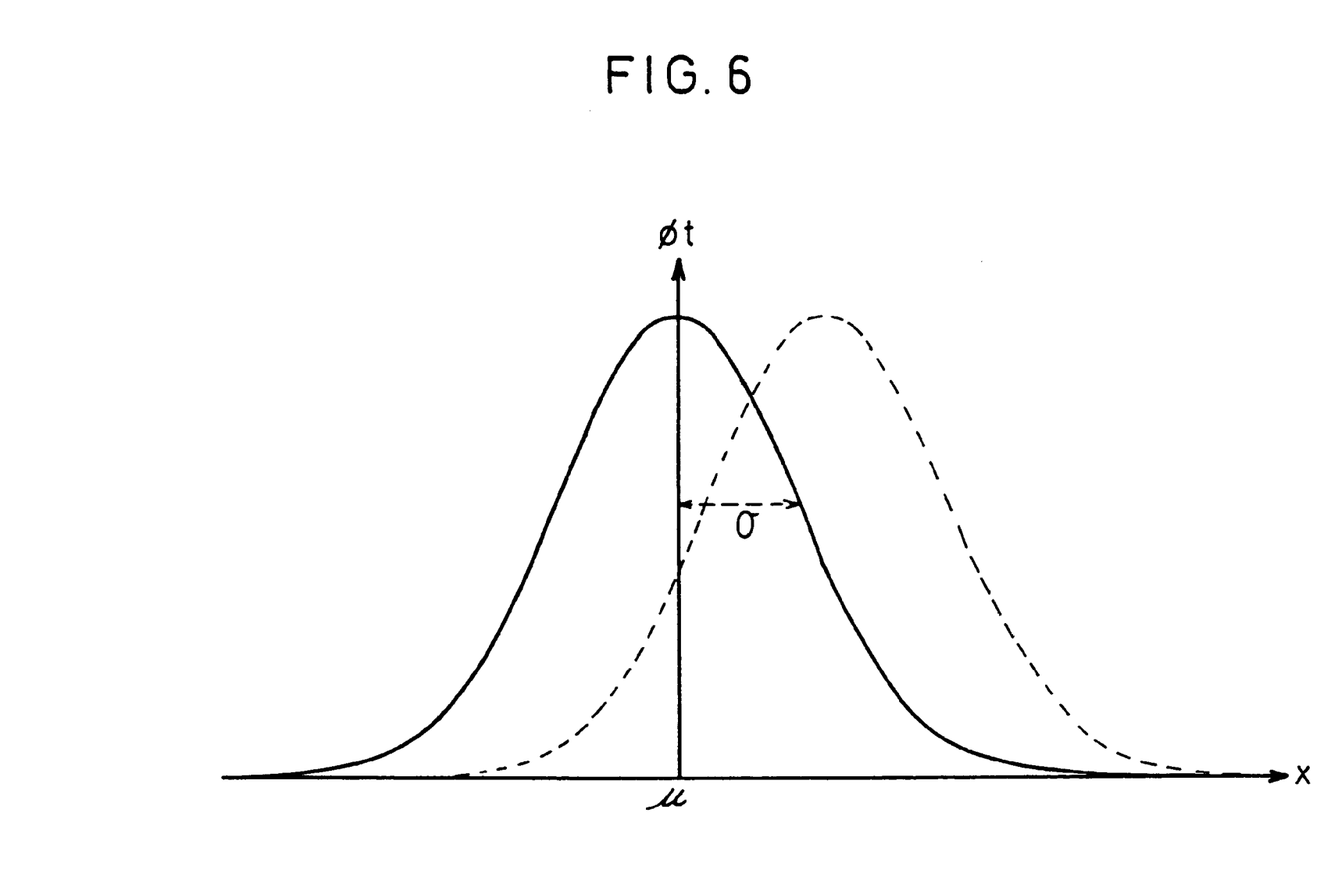
FIG. 6 is a diagram showing a weighting function with respect to CMY balance data.

If the color reproduction predicting LUT 18 of all colors were corrected using the CMY balance CMY' (gray) thus determined, then it would affect other colors than the target color. Therefore, the color reproduction predicting LUT 18 is corrected only in the vicinity of the target color as follows:

A corrective quantity for the gray is applied to a normal probability distribution process, and a weighting function H ($\mu$, $\sigma$, t) is established as follows:

$$H(\mu, \sigma, t) = \int_{\infty}^{t} \phi_t \, dx \quad (11)$$

where $\phi_t$ is a probability density function expressed by:

$$\phi_t=1/(\sqrt{2\pi} \cdot \phi) \cdot \exp(-(x-\mu)^2/2\sigma^2) \quad (12)$$

t represents saturation, $\sigma$ a standard deviation of the saturation, and $\mu$ an average value of the saturation. Since the saturation of the gray for the equation (11) is 0, the user sets $\mu$ to $\mu=0$ and uses the weighting degree for correction as the standard deviation $\sigma$ in the equation (11) in a step S16 (see FIG. 6). Using the established average value p and standard deviation a, the weighting function H ($\mu$, $\sigma$, t) with respect to the CMY balance data CMY' (gray) is determined in a step S18. Using the function F of the color reproduction predicting LUT 18 for converting the color image data CMYK expressed by the equation (1) into the calorimetric data Lab, the saturation t can be expressed by:

$$t=CH(F(CMYK)) \quad (13)$$

where CH is a function expressed by:

$$CH=\sqrt{a^{*2}b^{*2}} \quad (14)$$

The CMY balance data CMY' (gray) is weighted by the weighting function H ($\mu$, $\sigma$, t) thus determined, producing new CMY balance data CMY" (gray) as follows:

$$CMY''(gray)=CMY'(gray) \cdot H(\mu, \sigma, t) \quad (15)$$

From the CMY balance data CMY" (gray) and the color image data K, a corrected color reproduction predicting LUT 18 (function F') capable of producing calorimetric data Labadj expressed by:

$$Labadj=F'(CMYK) \quad (16)$$

is generated in a step S20.

The color reproduction predicting LUT 18 thus generated is established in the proof generating device 16, and the proof generating device 16 generates a proof using the color reproduction predicting LUT 18. Because the target color of gray of the proof has been corrected according to the observational conditions, the proof is compensated for a visual color-matching relationship with respect to gray. For correcting the color reproduction predicting LUT 18 as described above, the gray is subjected to the correction weighting using the probability density function $\phi_t$ which is represented by a Gaussian curve, and the weighting relative to surrounding colors is reduced. Consequently, only color conversion data in the vicinity of the color of gray are corrected, and any unnatural color reproduction is prevented from occurring in the printed document.

A target color to be corrected may be other than the color of gray. For example, a reference chart for a skin color on a printed document is generated under the same measurement conditions as those used when the color reproduction predicting LUT 18 before it is corrected, CMY balance data color-matched to the reference chart are calculated using the color reproduction predicting LUT 18 before it is corrected, from calorimetric data Lab obtained by measuring the reference chart, and a CMY balance chart is outputted from the printed document generating device 14 based on the CMY balance chart and a plurality of data in the vicinity thereof. Then, the reference chart and the CMY balance chart are compared with each other to determine a deviational quantity CMY (differ), and a corrected color reproduction predicting LUT 18 is determined according to the equations (4) and (15). The average value p of saturation in the weighting function H ($\mu$, $\sigma$, t) according to the equation (15) may be established so as to be equalized to the saturation of the target color.

Figure 7:
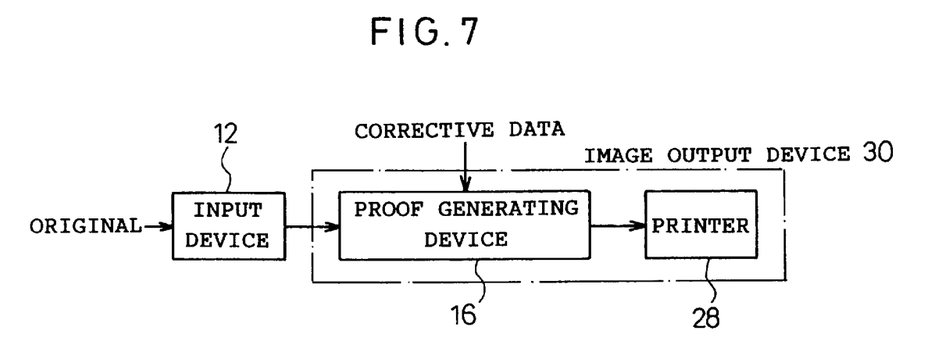
FIG. 7 is a block diagram of another system for effecting visual color matching between a proof and a printed document depending on observational conditions.
Figure 8:
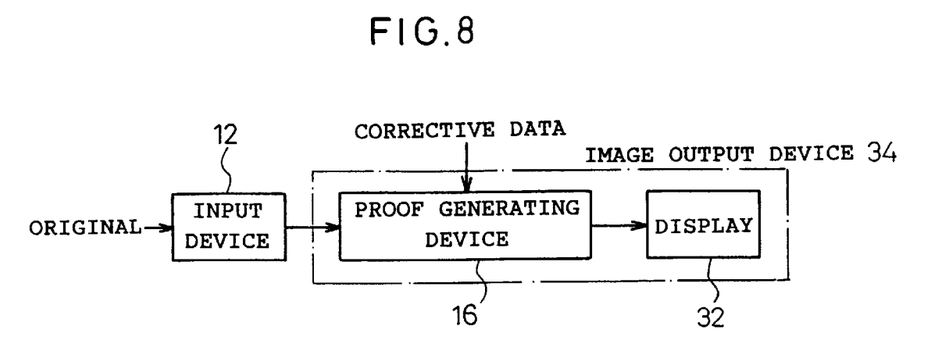
FIG. 8 is a block diagram of still another system for effecting visual color matching between a proof and a printed document depending on observational conditions.

In the above embodiment, the printed document and the proof are color-matched with respect to the target color. However, the principles of the present invention are also applicable to a process of achieving color matching in view of characteristic differences of a plurality of image output devices 30 each having a printer 28 as shown in FIG. 7 or a plurality of image output devices 34 each having a display 32 such as a CRT or the like, and different observational conditions.

For example, in the process applied to the image output devices 30, a proof chart and a reference plate for the printer 28 are prepared as a reference chart, device data metamerically color-matched to the reference chart are determined using color conversion data, and an outputted balance chart and the reference chart are compared with each other to correct the color conversion data. Deviations from the target color due to the characteristic differences between the plurality of printers 28 can thus easily be corrected. Similarly, deviations from the target color in color images displayed on the plurality of displays 32 can also easily be corrected.

Although certain preferred embodiments of the present invention has been shown and described in detail, it should be understood that various changes and modifications may be made therein without departing from the scope of the appended claims.

What is claimed is:

1. A method of correcting color conversion data for converting color image data into device data in an image output device to produce a color image based on the device data, comprising the steps of:

generating a reference chart of a target color;

determining device data color-matched to said reference chart and device data in a vicinity thereof using the color conversion data;

outputting a balance chart comprising a plurality of patches under predetermined conditions based on said device data;

selecting patches of the balance chart which are visually color-matched to said reference chart;

determining corrective data based on a deviational quantity between the device data of the selected patches and the device data to be color-matched to said reference chart; and correcting said color conversion data with said corrective data.

2. A method according to claim 1, wherein said color conversion data comprise data for converting the color image data into device data through calorimetric data.

3. A method according to claim 1, wherein said step of determining said corrective data comprises the step of determining the corrective data according to a linear combination polynomial approximation of said device data of the selected patches.

4. A method according to claim 1, further comprising the step of weighting said corrective data around said target color.

5. A method according to claim 4, wherein said step of weighting said corrective data comprises the step of weighting the corrective data according to a normal probability distribution with said target color as an average value and a correcting range provided by a standard deviation of saturation of said target color.

6. A method according to claim 1, wherein said reference chart comprises a reference chart of gray generated based on image data K among image data C, M, Y, K of said color image data.

7. A method according to claim 1, wherein said reference chart comprises a proof chart of the image output device.

8. A method according to claim 1, wherein said reference chart comprises an arbitrary color chart comprising data measured under the same measuring conditions as the measuring conditions used when the color conversion data before being corrected are generated.

9. A method according to claim 1, wherein said step of outputting a balance chart comprises the step of outputting the balance chart from a printed document generating device which uses a color image produced by the image output device as a proof.

10. A method according to claim 1, wherein said step of outputting a balance chart comprises the step of outputting the balance chart from the image output device.

11. A method according to claim 1, further comprising the step of generating said balance chart based on image data determined using inversion conversion data of said color conversion data and a plurality of proximity data produced by slightly varying said image data.

12. A method according to claim 1, wherein said predetermined conditions include observational conditions, color materials, and visual characteristics of the image output device.

* * * * *